United States Patent [19]
Arita et al.

[11] 3,804,6
[45] Apr. 16, 1974

[54] PROCESS FOR PRODUCING CASTING MOLDS USING A DRY FLOWABLE BLENDED SAND

[75] Inventors: Tokumitsu Arita, Nagasaki; Toshihiko Akanuma, Fukuoka, both of Japan

[73] Assignees: Mitsubishi Jukogyo Kabushiki Kaisha, Tokyo; Showa Tekko Kabushiki Kaisha, Fukuoka, both of, Japan

RELATED U.S. APPLICATION DATA

[63] Continuation-in-part of Ser. No. 111,600, Feb. 1, 1971, abandoned, which is a continuation-in-part of Ser. No. 32,557, Apr. 28, 1970, abandoned.

[22] Filed: May 23, 1972

[21] Appl. No.: 256,002

[30] Foreign Application Priority Data
May 27, 1969 Japan.................. 44-41108

[52] U.S. Cl............. 106/38.35, 106/38.3, 106/38.9, 106/84
[51] Int. Cl............................................... B28b 7/34
[58] Field of Search................ 106/38.3, 38.35, 38.9, 106/84

[56] References Cited
UNITED STATES PATENTS

| | | | |
|---|---|---|---|
| 2,234,646 | 3/1941 | Humphries............................ | 106/74 |
| 3,218,683 | 11/1965 | Nishiyama et al................. | 106/38.3 |
| 3,230,099 | 1/1966 | Cooper............................ | 106/38.35 |
| 3,345,302 | 10/1967 | Netting et al....................... | 106/38.3 |
| 3,442,665 | 5/1969 | Muller et al........................ | 106/38.3 |

FOREIGN PATENTS OR APPLICATIONS

| | | | |
|---|---|---|---|
| 654,817 | 6/1951 | Great Britain...................... | 106/38.3 |
| 898,867 | 6/1962 | Great Britain...................... | 106/38.3 |

*Primary Examiner*—Lorenzo B. Hayes
*Attorney, Agent, or Firm*—McGlew and Tuttle

[57] ABSTRACT

A method is described for producing a dry flowable blended sand and using this sand in making a casting mold. The blended sand is prepared by mixing a refractory particle, such as silicious sand, with an alkali metal silicate solution, such as a sodium silicate solution of at least 40 percent (weight) solids content whose $SiO_2$ to $Na_2O$ molar ratio has previously been adjusted with NaOH solution of at least 40 percent (weight) solids content to a molar ratio of 0.7 to 1.1 to thereby precipitate and deposit crystalline alkali metal silicate on the surface of said refractory particle, and thereafter blending the thus treated refractory particle with a powder of silicon, silicon alloy such as ferrosilicon, silicide such as calcium silicide or a mixture thereof, pouring the blended sand into a molding frame and allowing it to harden therein. The precipitation and deposition of the alkali metal silicate from solution is hastened by the addition of an alcohol such as methanol, or metal salt such as NaCl to the alkali metal silicate solution.

10 Claims, 5 Drawing Figures

PROCESS FOR PRODUCING CASTING MOLDS USING A DRY FLOWABLE BLENDED SAND

This application is a continuation-in-part of our copending application Ser. No. 111,600, filed Feb. 1, 1971, which is in turn a continuation-in-part of application Ser. No. 32,557, Apr. 28, 1970, both now abandoned.

BACKGROUND OF THE INVENTION

The present invention relates to improvements in the method of producing casting molds using granular materials and a method by which rigid casting molds can be produced at low cost. The invention also relates to an improved flowable sand for use in these molds.

As a molding sand for castings, there have been used blended sands which are prepared by blending and kneading natural casting sand containing about 10 percent of clay and silicious sand, with organic substances, such as resins and molasses, or inorganic coagulants such as cement, water-glass. All of these blended sands are capable of producing green sand molds having a strength of 1.0 kg/cm$^2$, and are charged into a molding frame or a core box compacted therein into a desired shape. In the above-described steps of the sand mold shaping method, the compacting operation is one which most calls for improvement since the most time and labor are spent for this operation.

As a counter measure to obviate such disadvantage, a novel process has recently come to be employed wherein a flowable blended sand is poured into a molding frame or a core box and allowed to solidify therein to form the desired sand mold and which, therefore, does not involve a compacting operation. As a method for completing a casting mold by imparting flowability to the blended sand, the present inventors have previously proposed a method of producing a casting mold which comprises preparing a blended sand by blending a refractory granule, such as silicious sand, which constitutes the main component of the molding sand, with a crystalline alkali metal silicate which acts as a coagulant, and a silicon alloy or a silicide or mixture thereof which act as a coagulation assistant. The blended sand in a dry state is poured into a molding frame and allowed to coagulate in said molding frame to form a casting mold. This method has the advantages that it does not involve a sand compacting operation and that, since the blended sand is flowable in a dry state, the amount of water, which is detrimental to the production of castings, can be reduced to an extremely low level. Nevertheless, the method still has disadvantages which will be described hereafter.

Namely, the method has the shortcoming that, since the surface of the silicious sand particles is not completely coated with the particles of the crystalline alkali metal silicate, the chemicals are required in large quantities. Furthermore, since the particle size of the crystalline alkali metal silicate and the particle size of the silicious sand are not the same, these ingredients are separated at the time of pouring into the molding frame with the result that unevenness of strength occurs in the casting mold upon hardening.

According to U.S. Pat. No. 3,218,683 to Nishiyama the object of addition of NaOH to sodium silicate is to control the hardening time, whilst in this invention it is added to adjust the SiO$_2$ to Na$_2$O molar ratio to 0.7–1.1 so that sodium silicate (sodium metasilicate) with the low molar ratio of the silicic acid component to the sodium component crystallize onto the surface of the silicious sand. Therefore, the object of the addition of NaOH in these two inventions differ essentially. In said patent to Nishiyama, sodium silicate having SiO$_2$ to Na$_2$O molar ratio of 1.0 is used to control the hardening time, whilst in this invention sodium silicate having the same molar ratio is employed to crystallize and solidify the sodium meta-silicate. Owing to this difference in the object, the solid components obtained in these two inventions are different. In the present invention, however, it is required that the reaction mixture contains more than 40 percent of solid components (SiO$_2$ + Na$_2$O), whilst according to said patent, the mixture is diluted with water so that it contains not more than 30 percent of solid components (specific gravity = 1.3). In this case as the mixture does not become dry state, the dryness and the flowability of the blended materials which are the significant feature of the present invention cannot be attained.

SUMMARY OF THE INVENTION

The present invention overcomes the foregoing shortcomings of the conventional method described above by mixing a small quantity of liquid sodium silicate with the crystalline alkali metal silicate, e.g., sodium meta-silicate, to attach the powdery sodium metasilicate onto the surface of the silicious sand while simultaneously coating the surface of the silicious sand with the liquid sodium silicate, and thereafter converting the liquid sodium silicate into crystalline sodium silicate.

The molar ratio of the silicic acid component (SiO$_2$) to the sodium component (Na$_2$O) in the sodium metasilicate is 1.0, i.e., SiO$_2$/Na$_2$O = 1. Therefore, the surface of the silicious sand is coated with the sodium metasilicate if the following reaction takes place on the surface of the silicious sand:

$$Na_2O \cdot nSiO_2 + NaOH \rightarrow Na_2SiO_3 \cdot nH_2O$$

Liquid sodium silicate where n = 2 – 3.5

Crystalline sodium metasilicate

The present inventors conducted a study of the foregoing reaction.

The conditions for the reaction between water-glass and caustic soda were examined, and the following results were obtained:
a. In the presence of not more than 50 percent of water, a complete solid can be obtained by adjusting the SiO$_2$ to Na$_2$O molar ratio to 1.
b. The reaction is completed in a few minutes by stirring the above-described liquid mixture.
c. The liquid mixture reacts and solidifies more quickly when alcohol, NaCl, KCl, etc., are added thereto.

Based on the foregoing results, a sodium silicate solution previously prepared by adding caustic soda to waterglass and having a SiO$_2$ to Na$_2$O molar ratio of 1 was added to silicious sand, and the mixture was blended in a mixer for a few minutes whereupon the mixture, which was sticky (not flowable) initially, after a few minutes became extremely flowable and the adhesive property of the mixture completely disappeared. The mixture was then blended with ferrosilicon and the resultant blended sand was poured into a wooden mold and subjected to a hardening reaction by letting it stand still or by heating followed by blowing in air after heating. A compression test conducted on the casting mold thus obtained revealed that the mold was sufficiently serviceable for practical use as a casting mold. It was also found that the flowability of the blended sand was further enhanced and crystallization was completed in a shorter period of time by the addition of alcohol, NaCl, KCl, etc., after the addition of the sodium metasilicate solution. The present invention is based on the above discovery.

One embodiment of the invention is directed to a method for producing a casting mold using a dry flowable blended sand which comprises preparing the blended sand by a process comprising adding to a refractory particle, such as silicious sand, a solution of alkali metal silicate, such as sodium silicate, having a $SiO_2$ to $Na_2O$ molar ratio of 0.7 – 1.1 thereby to coat the surface of said refractory particle with the alkali metal silicate solution, blending the mixture to precipitate and deposit crystalline alkali metal silicate on the surface of said particle whereby the particle becomes nonsticky and extremely flowable, and then blending the particle with powdered silicon, silicon alloy, silicide or a mixture thereof which act as coagulation assistants, pouring the blended sand thus prepared into a molding frame and coagulating the same in said molding frame to obtain a casting mold. Another embodiment of the invention is directed to a process of the character described above wherein one or more metal salts are added to said solution of alkali metal silicate prepared in a $SiO_2$ to $Na_2O$ molar ratio of 0.7 – 1.1 so that the crystalline alkali metal silicate is precipitated more quickly. The methods according to the present invention have the advantages that the blended sand used in either method is highly flowable and no compacting operation is required; that the quantities of the additives are small as compared with the conventional method since the surface of the refractory particle, e.g., silicious sand, is completely coated with the crystalline alkali metal silicate, while avoiding unevenness of strength in the casting mold upon hardening of the blended sand; and further that the expenditure for chemicals can be drastically reduced since the crystalline alkali metal silicate can be formed from a cheap alkali metal silicate having a $SiO_2$ to $Na_2O$ molar ratio of 2 – 3.5, e.g., a commercial water-glass, and an alkali, e.g., caustic soda, which is also inexpensive.

In another embodiment of the invention a dry flowable sand is prepared by mixing 100 parts of silicate containing from 2–5 percent of $Na_2SiO_3$ of molar ratio $SiO_3$ to $Na_2O$, 0.7–1.1, from 1–4 percent of coagulation assistant (e.g., ferrosilicon, etc.), all of said percents and parts being by weight.

In a further embodiment, the same proportions of ingredients are used as in the imeediately preceding embodiment and in addition from about 1 percent to about 1.0 percent by weight of crystallization promoter (e.g., sodium chloride, etc.).

DETAILED DESCRIPTION

The process of the present invention will be described in more detail hereinafter.

Figure 1:
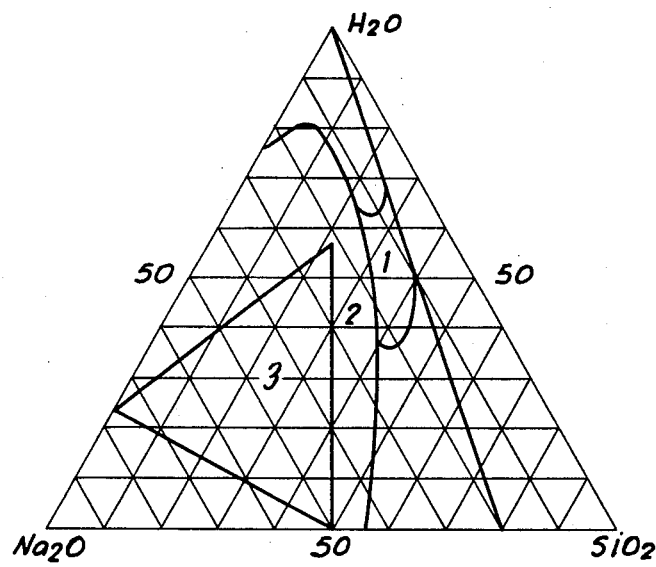
FIG. 1 is a graphical representation of the three component system $H_2O - Na_2O - SiO_2$.

The mechanism for forming crystalline sodium silicate will now be explained. Water-glass comprises three components, namely, a silicic acid component, $SiO_2$, an alkali metal component, such as $Na_2O$, and water, $H_2O$, in the proportion shown in the graph of FIG. 1. Referring to FIG. 1, region 1 represents ordinary liquid water-glass, the $SiO_2$ to $Na_2O$ molar ratio of which is in the range 1.6 to 3.3; region 2 represents waterglass containing crystalline sodium silicate; and region 3 represents crystalline sodium silicate.

Although it is seen from the graph that crystalline sodium silicate can be formed from water-glass by lowering the $SiO_2$ to $Na_2O$ molar ratio to 1 or below, with the water content being fixed at a certain level, the present inventors conducted experiments with a view to establishing particular conditions for the crystallization. Namely, the state of crystallization was observed on a solution having a $SiO_2$ to $Na_2O$ molar ratio of 1 which had been obtained by adding caustic soda to a liquid water-glass having a high molar ratio. It was found that while a long time is required for crystallization when the solution is quiescent, crystals are formed readily when the solution is stirred. Furthermore, crystallization occurs immediately when a small quantity of alcohol, sodium chloride, sodium aluminate, etc., are added to the above-mentioned solution.

Such crystallization promoting mechanism is presumably attributed to the dehydrating action or hydrating action of the additives. As the additive, such metal salts as manganese sulfate, ferrous ammonium sulfate, potassium nitrate, potassium sulfate, aluminum sulfate, cadmium chloride, cupric chloride, ferrous chloride, chromium chloride, sodium sulfite, ferric chloride, soda lime, barium chloride, sodium bicarbonate, sodium biphosphate, sodium nitrate, zinc chloride, etc., proved effective in addition to the aforesaid salts. Alcohol, mentioned above, has in addition to the crystallization promoting effect, an effect of inhibiting an initial reaction.

Salts and alcohols are known as gelation promoters. However, they are not used as gelation promoters in this invention. An extremely small amount of alcohol or salts promotes crystallization of sodium silicate on the surface of silica sands by removing free water from a sodium silicate solution having a low $SiO_2$ to $Na_2O$ molar ratio. For this reason, they are used in this invention.

While the mechanism by which crystalline sodium silicate is formed from liquid water-glass has been explained above, the final object of the present invention is to produce a rigid casting mold by coating the crystalline sodium silicate onto the surface of silicious sand particles and thereafter reacting a silicon compound with said coating of crystalline sodium silicate. The mechanism of hardening is considered as follows:

The hardening proceeds even if the blended sand is left to stand in a mold, but it is practical to heat the metal mold containing the blended sand to a temperature higher than the melting point of the crystalline sodium silicate or to heat the metal mold to a temperature higher than the melting point of the crystalline sodium silicate prior to pouring in the blended sand and to blow hot air into the blended sand through slits in the metal mold upon completion of the reaction.

Figure 3:
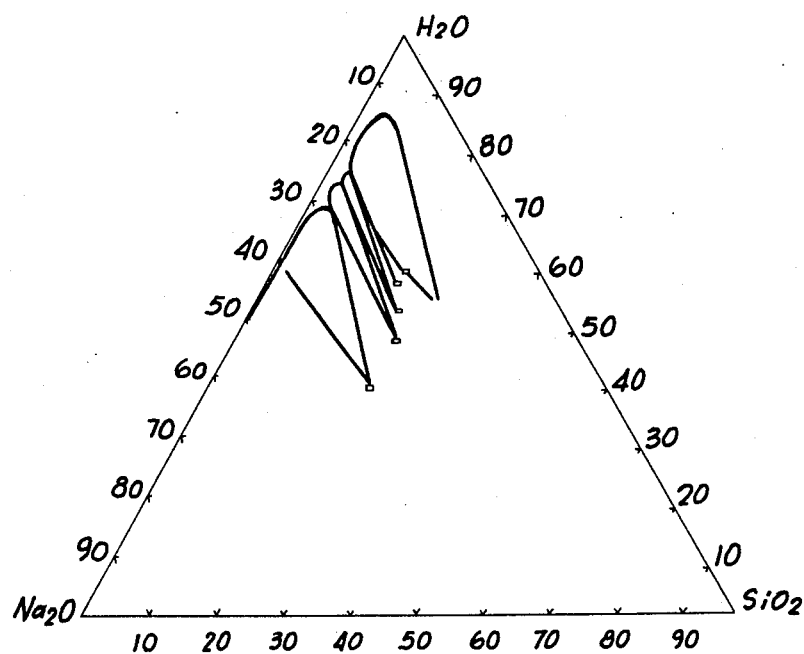
FIG. 3 is a composition graph showing the conditions under which crystalline sodium silicate is precipitated from a solution of sodium silicate of low molar ratio.
Figure 4:
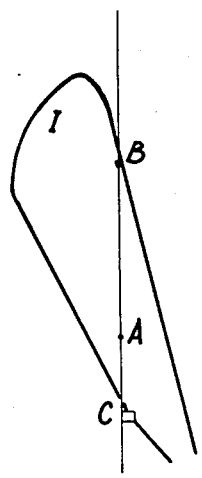
FIG. 4 is a view showing a portion of FIG. 3 on an enlarged scale.

FIGS. 3 and 4 show the conditions under which crystalline sodium silicate precipitates at 31° C from a sodium silicate solution of low molar ratio. In the diagrams, numeral I indicates the region in which a hydrate of sodium metasilicate precipitates. For instance, from a sodium silicate solution of a molar ratio of 1.0, represented by point A in region I, a sodium metasilicate crystal corresponding to AC remains. It is thus seen that at the stage where sodium metasilicate crystals are being precipitated and deposited on the surface of a refractory particle such as silicious sand, which occurs after the sodium silicate solution having a molar ratio of 1.0 is added to said silicious sand according to the present invention, excess solution is present on said surface in addition to the crystals with which said surface is coated. However, the excess solution has no adverse effect on the flowability of the blended sand.

If, for example, Fe-Si is used as a coagulation assistant, the Si component in the Fe-Si will react with free NaOH and $H_2O$ in the excess solution as follows:

$$2NaOH + H_2O + Si \rightarrow Na_2SiO_3 \cdot H_2O = H_2 \quad (1)$$

The above is an exothermic reaction and thus the temperature of the blended sand rises gradually as the reaction proceeds. When the temperature of the blended sand exceeds the melting point of the crystalline sodium silicate, the crystalline sodium silicate melts and the following reactions rapidly take place:

$$Na_2SiO_3 \cdot 9H_2O \rightarrow NaOH + NaHSiO_3 + (n-1)H_2O \quad (2)$$

$$NaOH + H_2O + Si \rightarrow Na_2SiO_3(n-2)H_2O + H_2 \quad (3)$$

These reactions form a sol due to the presence of Si and $H_2O$, but in the presence of alcohol, part of the heat generated by reaction (1) is taken away as the heat of vaporization of alcohol and thus reaction (2) is supressed.

$$CH_3OH \text{ (liq.)} \rightarrow CH_3OH \text{ (vapor)} + 8.48 \text{ Kcal/mole (at } 64.75° \text{ C)} \quad (4)$$

The above illustrates the inhibiting effect of the initial reaction by alcohol.

The crystalline alkali metal silicate is melted by the heat of reaction, but a portion thereof or a portion of the sodium silicate formed by reaction (3) is dehydrated as shown in the following equation:

$$Na_2SiO_3 \cdot nH_2O \xrightarrow{\text{dehydration}} Na_2SiO_3 + nH_2O \quad (5)$$

In the manner described above, the reaction system is progressively dehydrated and hardened with the refractory particles, such as silicious sand, being tightly bonded together and thus producing a rigid casting mold. When the metal mold is previously heated to a temperature above the melting point of the crystalline alkali metal silicate, the reaction represented by formula (2) takes place immediately and thus the reaction time is shortened. On the other hand, if air or hot air is blown into the metal mold through slits in said mold after the blended sand has reached its peak temperature, the water present in the blended sand evaporates from the surface thereof. Thus the sol of $Na_2SiO_3(n-2)H_2O$ is quickly dehydrated into a gel with the refractory particles, such as silicious sand, being tightly bonded together and thus forming a more rigid casting mold.

As a material to form the crystalline alkali metal silicate which serves as the coagulant, inexpensive sodium silicate and potassium silicate, e.g., water-glass, and caustic soda and caustic potash are used. These are far more inexpensive than the sodium metasilicate $Na_2SiO_3 \cdot 9H_2O$, $Na_2SiO_3 \cdot 6H_2O$, and $Na_2SiO_3 \cdot 4H_2O$, which are commercially available.

As a coagulation assistant, silicon, silicon alloys and silicides may be used. In the examples given below, use was made of ferrosilicon containing 75 percent of Si and having a particle size not greater than 200 mesh and which is a silicon alloy which is easy to procure. As an example of a silicide which is useful according to the invention, alkaline earth metal silicides, e.g., calcium silicide is employed.

The present invention will be further illustrated by the following examples, in which parts are by weight unless otherwise indicated and the relationship of parts by weight to parts by volume is as that of grams to cubic centimeters.

EXAMPLE 1

The method for adjusting the molar ratio of sodium silicate

Sodium silicate is represented by a general formula $Na_2O \cdot nSiO_2$ in which $n$ denotes the molar ratio. The molar ratio means the value calculated from the following equation:

$SiO_2$ (in weight)/$Na_2O$ (in weight) × 1.031

Sodium silicate solution which is used in the process according to the invention is required to have the molar ratio of $SiO_2$ to $Na_2O$ of 0.7 – 1.1 and to contain at least 40 percent, preferably 43–45 percent of solid components by weight. The sodium silicate is thus prepared generally by adding caustic soda to water glass of JIS No. 2 ($SiO_2$:33.09 percent, $Na_2O$:14.84 percent). An example of calculation for the preparation of the sodium silicate with the required molar ratio according to the invention is shown in the following:

a. A result of quantitative analysis of sodium silicate of JIS No. 2 is shown in Table 1.

TABLE 1

|  | $Na_2O$ | $SiO_2$ | $H_2O$ and other components |
|---|---|---|---|
| Analytical value | 14.84 | 33.09 |  |
| Solid components | 47.93 |  | 52.07 | b. Caustic soda decomposes as illustrated by the following equation.

$$2NaOH = Na_2O + H_2O$$
$$80 \quad\quad 62 \quad\quad 18$$

80 parts by weight of caustic soda decomposes to 62 parts by weight of $Na_2O$ and 18 parts by weight of water.

c. In order to adjust the molar ratio of the sodium silicate referred to in item (a) to 1.0 by adding $Na_2O$, the amount of $Na_2O$ to be added should be calculated from the following equation.

molar ratio = $SiO_2/Na_2O \times 1.031 = 33.09/14.84 + X \times 1.031$ $14.84 + X = 33.09 \times 1.031$ $X = (33.09 \times 1.031) - 14.84 = 19.28$ Accordingly by adding 19.28 parts by weight of $Na_2O$ to the sodium silicate described above its molar ratio is adjusted to 1.0.

d. The amount of NaOH required to obtain 19.28 parts by weight of $Na_2O$ is calculated from the following equation.

$Y = 80 \times X/62 \times 62 \times 19.28/62$ $Y = 24.9$

Accordingly 24.9 parts by weight of NaOH is required. In this case from 19.2 parts by weight of NaOH, 19.28 parts by weight of $Na_2O$, and 5.62 parts by weight of water are obtained as shown in the following equation.

$Y - X = 24.9 - 19.28 = 5.62$

NaOH is generally added in an aqueous solution and when a 47 percent NaOH solution is used the substantial amount of NaOH solution added is calculated from the following equation $Z = 24.9 \div 0.47 = 53$ Accordingly the substantial amount of such NaOH solution is 53 parts by weight.

To summarize these results, by adding 53 parts by weight of 47 percent NaOH solution to 100 parts by weight of sodium silicate, a sodium silicate with low molar ratio of 1 and containing 43.9 percent of solid components is obtained as illustrated in Table 2.

TABLE 2

| $Na_2O$ | $SiO_2$ | $H_2O$ and other components | Total |
|---|---|---|---|
| 14.84 | 33.09 | 52.07 | 100 |
| 19.28 |  | 38.72 | 53 |
| 34.12 | 33.09 | 85.79 | 153 |
| 22.3 | 21.6 | 56.1 | 100 | solid components.... $22.3 + 21.6 = 43.9$ percent

EXAMPLE 2

Blended Sands of Superior Flowability

The fact that the blended sand of the present invention is superior in flowability to those used in the conventional carbon dioxide process using water glass as the coagulant and the powder molding process using sodium metasilicate as the coagulant, is apparent from the foregoing description. However, for comparison, the flowabilities of silicious sand and various blended sands were examined by a bulk density measuring method. Namely, the bulk density of each sand was determined from the weight of the same gravitationally packed in a fixed volume, i.e., a 350 ml. container. The results are shown in Table 3.

TABLE 3

| Run No. | Blend | Bulk Density |
|---|---|---|
| a | No. 6 silicious sand only | 1.40 |
| b | No. 6 silicious sand + 5 parts of water glass (molar ratio 2.3) | 0.85 |
| c | No. 6 silicious sand + 4 parts of sodium metasilicate (crystal) + 1.5 parts of Fe-Si | 1.27 |
| d | No. 6 silicious sand + 3.6 parts of sodium silicate solution (molar ratio 1.0) + 1.5 parts of Fe-Si | 1.25 |
| e | No. 6 silicious sand + 3.6 parts of sodium silicate solution (molar ratio 1.0) + 0.2 part of methyl alcohol + 1.5 parts of Fe-Si | 1.38 |
| f | No. 6 silicious sand + 3.6 parts of sodium silicate solution (molar ratio 1.0) + 0.2 part of sodium aluminate (30% solution) + 1.5 parts of Fe-Si | 1.31 |
| g | No. 6 silicious sand + 3.6 parts of sodium silicate solution (molar ratio 1.0) + 0.2 part of NaCl solution (20% solution) + 1.5 parts of Fe-Si | 1.32 |
| h | No. 6 silicious sand + 3.6 parts of sodium silicate solution (molar ratio 1.0) + 0.1 part of methyl alcohol and 0.1 part of NaCl solution (20% solution) + 1.5 parts of Fe-Si | 1.35 |
| i | No. 6 silicious sand + 3.6 parts of sodium silicate solution + 0.1 part of methyl alcohol and 0.1 part of sodium aluminate (30% solution) and 0.1 part of NaCl solution (20% solution) + 1.5 parts of Fe-Si | 1.38 |

Note 1: No. 6 silicious sand refers to a silicious sand whose fineness number is 105 by A.F.S. method.
Note 2: The quantity of No. 6 silicious sand in Run Nos. b–i is 100 parts.

From the above results and in view of the fact that the sand used in the conventional carbon dioxide process, utilizing water-glass as the coagulant, is low in bulk density and thus inferior in flowability and must, therefore, be compacted to obtain a bulk density of 1.20 or higher, it will be apparent that any one of the blended sands $d-i$ used in the present invention has a bulk density of 1.2 or higher and is highly flowable. The sodium silicates in runs $d-i$ inclusive were prepared according to the method described in Example 1. Consequently, it will be seen that by operating according to the present invention, a casting mold adapted for practical use can be obtained with the utilization of little external force.

EXAMPLE 3

Preparation of Blended Sand for Casting Molds

The flowabilities of a blended sand $j$ which had been prepared by adding to 100 parts of No. 6 silicious sand 3.6 parts of various types of low molar ratio sodium silicates, blending the mixture for 5 minutes, adding 1.8 parts of ferrosilicon powder and blending the resultant mixture for 2 minutes; a blended sand $k$ which had been prepared by adding to 100 parts of No. 6 silicious sand 3.6 parts of various types of low molar ratio sodium silicates, blending the mixture for 3 minutes, adding 0.2 part of methyl alcohol as a crystallization promoter, blending the resultant mixture for 2 minutes, adding 1.8 parts of ferrosilicon powder and blending the resultant mixture for 2 minutes; and blended sand $l$ which had been prepared under the same conditions as the blended sand $k$ but by adding 0.2 part of sodium aluminate as the crystallization promoter; were measured in the same manner as in Example 2. A Simpson-type mill was used for blending. The results are shown in FIG. 2.

Figure 2:
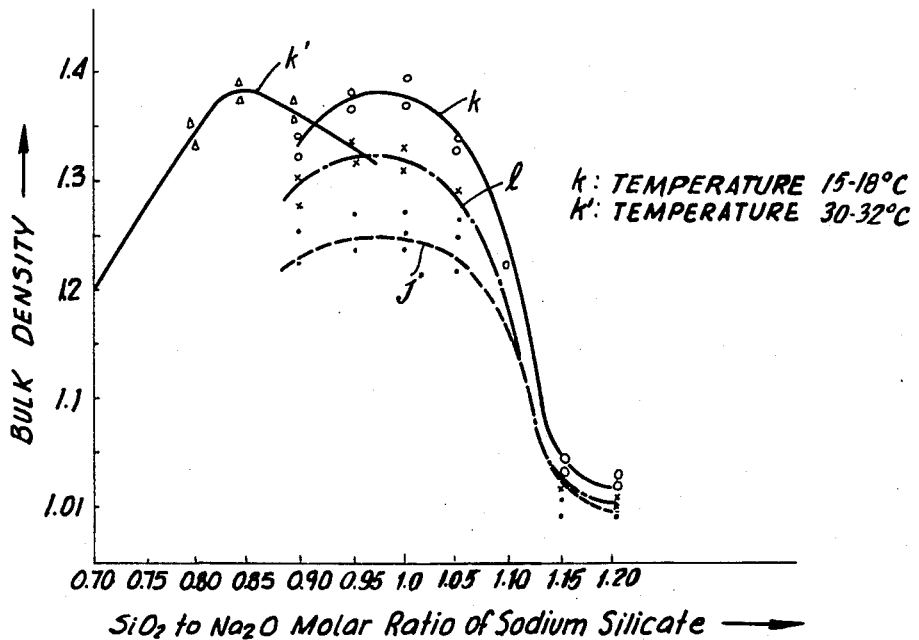
FIG. 2 is a graph showing the relationship between the molar ratio $SiO_2/Na_2O$ and the bulk density of blended sand.

In FIG. 2, curves $j$, $k$ and $l$ show the results of bulk density measurements at a temperature of 15° – 18° C. All of the blended sands had a bulk density of 1.2 or higher at a $SiO_2$ to $Na_2O$ molar ratio in the sodium silicate of 0.95 to 1.1. Curve $k'$ shows the bulk density of a blended sand of the composition as that mentioned above measured at a temperature of 30° – 32° C. In this case, the bulk density of the sand is 1.2 or higher even at a $SiO_2$ to $Na_2O$ molar ratio in the sodium silicate of 0.7. From FIG. 2 it is seen that any one of the blended sands of the present invention has excellent flowability. Based on the foregoing results, the $SiO_2$ to $Na_2O$ molar ratio in the alkali silicate solutions used in the present invention is therefore restricted to 0.7 – 1.1.

FIG. 2 also shows that the blended sands represented by curves $k$ and $l$, which contain a crystallization promoter, have superior flowability relative to the blended sand represented by curve $j$ which does not contain a crystallization promoter.

EXAMPLE 4

Making Casting Molds From Blended Sand

A blended sand $m$ which had been prepared by adding to 100 parts of No. 6 silicious sand 3.5 parts of sodium silicate solution having a $SiO_2$ to $Na_2O$ molar ratio of 1.0, blending the mixture for 5 minutes, adding 1.5 parts of ferrosilicon powder and blending the resultant mixture for 2 minutes; a blended sand $n$ which had been prepared by adding to 100 parts of No. 6 silicious sand 3.5 parts of sodium silicate solution having a $SiO_2$ to $Na_2O$ molar ratio of 1.0, blending the mixture for 3 minutes, adding 0.2 part of methyl alcohol as crystallization promoter, blending for 2 minutes, adding 1.5 parts of ferrosilicon powder and blending the resultant mixture for 2 minutes; and a blended sand $p$ which had been prepared under the same conditions as the blended sand $n$ but with 0.2 part of a 20% NaCl solution as the crystallization promoter; were individually poured into a metal mold having an inner diameter of 50 mm. and a height of 50 mm. and heated at 100° C for 20 minutes to produce sample molds. The blendings were effected in a Simpson-type mill. The compression resistance and air permeability of each sample mold were measured with the results shown in Table 4.

TABLE 4

| Run No. | Crystallization Promoter | Compression Resistance (kg/cm²) | Air Permeability |
|---|---|---|---|
| m | None | 26.5 | 280 |
| n | Methyl alcohol | 31.5 | 242 |
| p | NaCl solution (20% solution) | 28.4 | 250 |

It is seen from Table 4 that the casting molds produced by the process of this invention have excellent compression resistance and air permeability.

EXAMPLE 5

Blended Sands For Use in Casting Molds

Figure 5:
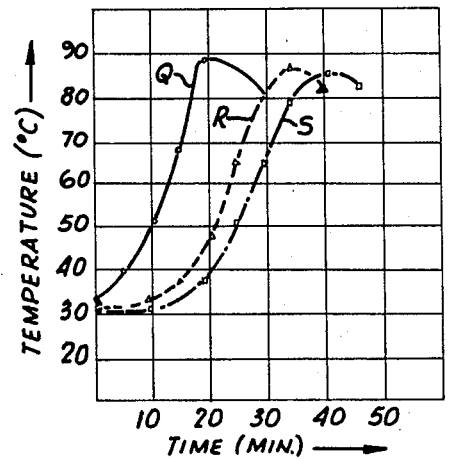
FIG. 5 is a graph showing the influence of alcohol on reaction velocity.

A blended sand Q which was prepared by adding to 100 parts of No. 6 silicious sand 3.5 parts of sodium silicate solution having a $SiO_2$ to $Na_2O$ molar ratio of 0.95, blending for 5 minutes, adding 1.5 parts of ferrosilicon powder and blending for 2 minutes; and blended sands R and S which were prepared by adding to 100 parts of silicious sand 315 parts of sodium silicate solution having a $SiO_2$ to $Na_2O$ molar ratio of 0.95, blending for 3 minutes, adding 0.2 part and 0.3 part of methanol, respectively, blending for 2 minutes, and adding 1.5 parts of ferrosilicon powder and blending for 2 minutes; were individually charged in 1 litre beakers and the temperatures were measured at the central portion of each charge of blended sand. The foregoing blendings were effected using a Simpson-type mill. FIG. 5 shows plots of temperature vs. time.

It is seen from FIG. 5 that the temperature immediately after blending, i.e., the initial temperature, of the blended sand Q which does not contain methanol is higher than those of the blended sands R and S which contain methanol. This is due to the fact that the ingredients of blended sand Q begin to partially react with each other during the course of the blending, and the reaction proceeds rapidly after the blending so that a sufficiently long pot life necessary for the pouring operation is not attained. It is desirable that the hardening reaction be suppressed until the molding operation is completed and then proceeds rapidly after completion of the molding. From the curves corresponding to blended sands R and S, it is seen that the hardening reaction is suppressed for about 10 minutes after blending and commences thereafter. This clearly illustrates the outstanding effect of alcohol as a reaction controlling agent in the present invention.

In the present invention, as described in detail herein, the surface of the blended sand particles are completely coated with a crystalline alkali metal silicate so that the quantities of the chemicals to be added can be minimized compared to conventional methods, and moreover, there is no occurrence of unevenness of strength in the hardened mold. Furthermore, since the crystalline alkali metal silicate can be formed from an inexpensive alkali silicate, e.g., commercial water-glass having a $SiO_2$ to $Na_2O$ molar ratio of 2 – 3.5 and an inexpensive alkali, e.g., caustic soda, the cost of chemicals can be drastically reduced. Still further, since the blended sand is dry and readily flowable, the compacting operation which requires the most labor in the casting process can be eliminated, and the water remaining in the casting mold produced after hardening can be reduced to a minimum. In addition, since the casting molds produced by the method of this invention are strong and have high air permeability, sound castings which are substantially free of blowhole or scab are obtained from said molds.

EXAMPLE 6

A dry flowable sand is prepared by adding 3.5 percent of water glass at the molar ratio to silicious sand of 1.0:100 and the mixture was kneaded for 4 minutes in a small sized Simpson mill and the flowability (apparent specific gravity) of the mixture which varied with the passage of time shows the improved flowable properties of the sand prepared according to the invention.

If in the foregoing examples calcium silicide is used in place of ferrosilicon, good results are obtained. Also, a blend of equal parts of ferrosilicon and calcium silicide is usefully substituted therefor.

The examples described herein illustrate use of silicious sand as the principal material of the casting molds, but it is understood that refractory particles, e.g., metal particles, may also be used in the practice of this invention. In addition, powdered wood, carbonacious substances, pitch, etc., may be added to the blended sands of this invention.

The present invention makes a significant contribution to the improvement of production and the lowering of the cost of making castings and hence is of great industrial value.

What is claimed is:

1. In a process for producing a casting mold comprising the steps of (a) making a dry, flowable refractory composition by (i) mixing refractory particles comprising silica sand with an alkali metal silicate solution, (ii) blending the thus treated refractory particles with a crystallization promoter selected from the group consisting of sodium chloride, potassium chloride, sodium aluminate, potassium nitrate, sodium bicarbonate, zinc chloride, aluminum sulfate, methyl alcohol, ethyl alcohol and propyl alcohol, (iii) blending the resultant mixture of refractory particles and promotor with a coagulation assistant selected from the group consisting of powdered silicon, powdered silicon alloy consisting of ferrosilicon, calcium silicide, and mixtures thereof, and pouring the resultant flowable refractory composition into a molding frame and allowing said refractory composition to harden in the presence of heat, the improvement which comprises using in said process an alkali metal silicate solution consisting essentially of a solution of an alkali metal silicate of an alkali metal M having a $SiO_2$ to $M_2O$ molar ratio of about 0.7 to about 1.1 and a solids content of at least 40 percent by weight, whereby crystalline alkali metal silicate is precipitated and deposited on the surface of said refractory particles.

2. The process of claim 1, wherein the alkali metal silicate solution is a sodium silicate solution.

3. The process of claim 1, wherein 100 parts of the solution of silicate of alkali metal contain from about 2 percent to about 5 percent of $Na_2SiO_3$ whose molar ratio of $SiO_2$ to $Na_2O$ is from about 0.7 to about 1.1, all of said parts and percents being by weight; from about 1 percent to about 4 percent by weight of coagulation assistant is employed; and from about 0.1 percent to about 1.0 percent by weight of crystallization promotor is employed.

4. The process of claim 1, wherein the solution of sodium silicate is prepared by adding sufficient NaOH in an aqueous solution of at least 40 percent by weight to solids, to a solution of water-glass having a $SiO_2$ to $Na_2O$ molar ratio of about 2 to about 3.5 to thereby change said $SiO_2$ to $Na_2O$ molar ratio to about 0.7 to about 1.1.

5. The process of claim 4, wherein the molding frame is heated to a temperature at least above the melting point of the crystalline sodium silicate prior to pouring the blended mixture therein.

6. The process of claim 5, wherein the crystalline sodium silicate is substantially $Na_2SiO_3 \cdot 9H_2O$ having a melting point of about 47° C.

7. The process of claim 6, wherein the promoter is a lower alkanol.

8. A process according to claim 7 in which the refractory particles comprise silicious sand, and the aqueous solution of alkali metal silicate comprises a solution obtained by addition of aqueous sodium hydroxide to water glass.

9. The process of claim 6, in which sodium chloride is added to the mixture of aqueous solution of alkali metal silicate and refractory particles to assist deposition of the alkali silicate.

10. The process of claim 6, in which sodium aluminate is added to the mixture of aqueous solution of alkali metal silicate and refractory particles to assist deposition of the alkali metal silicate.

* * * * *